(12) United States Patent
Lemmers, Jr. et al.

(10) Patent No.: US 8,568,089 B2
(45) Date of Patent: Oct. 29, 2013

(54) GEAR ARRANGEMENT

(75) Inventors: Glenn C. Lemmers, Jr., Loves Park, IL (US); David S. Behling, Belvidere, IL (US); Leroy R. Rateike, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 588 days.

(21) Appl. No.: 12/793,122

(22) Filed: Jun. 3, 2010

(65) Prior Publication Data

US 2011/0299971 A1 Dec. 8, 2011

(51) Int. Cl.
F01D 15/02 (2006.01)

(52) U.S. Cl.
USPC .................... 415/122.1; 416/170 R

(58) Field of Classification Search
USPC ............. 415/122.1, 124.1, 124.2; 416/170 R; 310/75 R, 83
See application file for complete search history.

(56) References Cited

U.S. PATENT DOCUMENTS

| | | | |
|---|---|---|---|
| 3,951,573 A * | 4/1976 | Dunning et al. | 417/423.13 |
| 4,269,293 A | 5/1981 | Martin | |
| 4,588,322 A | 5/1986 | Shoemaker et al. | |
| 4,685,550 A | 8/1987 | Metcalf | |
| 4,871,296 A | 10/1989 | Laessle et al. | |
| 4,914,906 A * | 4/1990 | Burch | 60/788 |
| 5,031,740 A * | 7/1991 | Deichstetter et al. | 192/24 |
| 5,174,109 A | 12/1992 | Lampe | |
| 5,267,433 A | 12/1993 | Burch | |
| 5,596,902 A | 1/1997 | McMillen | |
| 6,059,085 A | 5/2000 | Farnsworth | |
| 6,619,454 B2 * | 9/2003 | Hayward | 192/40 |
| 6,732,529 B2 | 5/2004 | Anderson | |
| 7,182,193 B2 * | 2/2007 | Howard | 192/69.2 |
| 7,946,403 B2 * | 5/2011 | Burke et al. | 192/90 |
| 2010/0104233 A1 * | 4/2010 | Bando et al. | 384/490 |
| 2010/0108458 A1 * | 5/2010 | Harris et al. | 192/69 |

FOREIGN PATENT DOCUMENTS

| | | |
|---|---|---|
| EP | 1391621 | 2/2004 |
| EP | 1548311 | 6/2005 |
| EP | 2098741 | 9/2009 |

OTHER PUBLICATIONS

European Search Report, mailed Dec. 2, 2011, EP Application No. 11168623.4.

* cited by examiner

*Primary Examiner* — Nathaniel Wiehe
*Assistant Examiner* — Justin Seabe
(74) *Attorney, Agent, or Firm* — Carlson, Gaskey & Olds P.C.

(57) ABSTRACT

An example gear arrangement includes a gearbox shaft and a journal shaft. The journal shaft establishes an opening that receives an end portion of the gearbox shaft. The gearbox shaft is configured to rotate the journal shaft. The journal shaft is configured to selectively rotatably couple with another shaft. The journal shaft is allowed to align to the bearing surface while the gearbox shaft allows for misalignment between the accessory and gearbox drive.

8 Claims, 4 Drawing Sheets

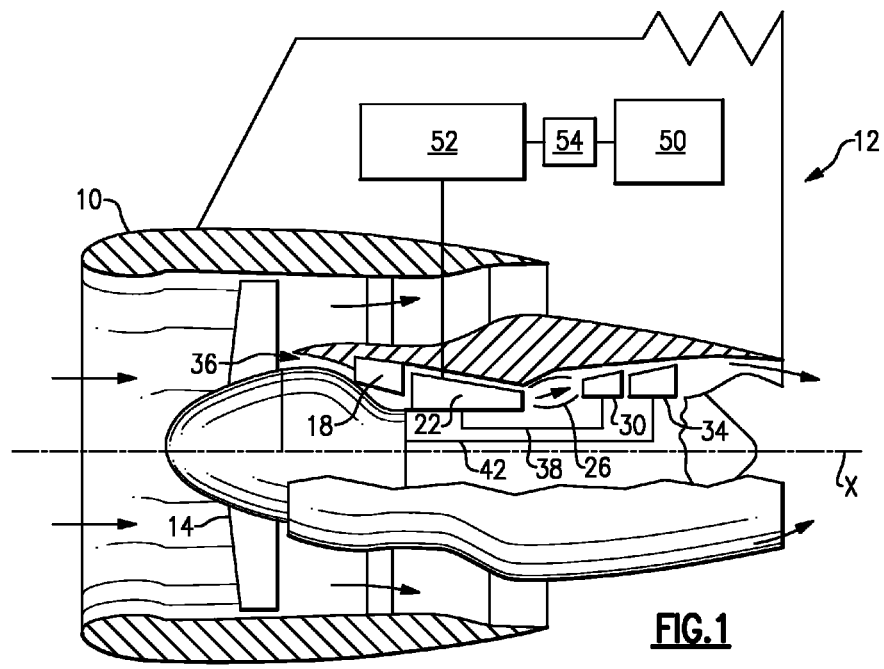
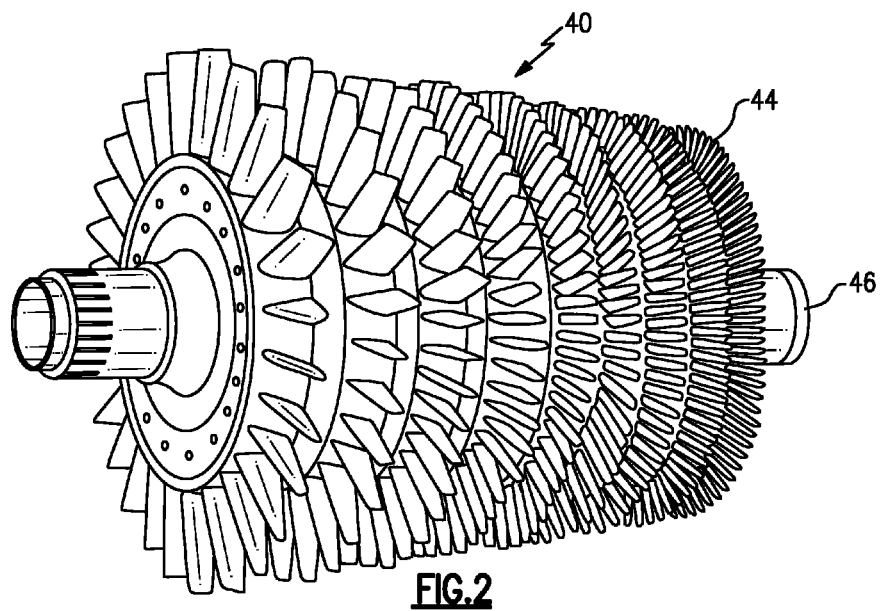

GEAR ARRANGEMENT

BACKGROUND

This disclosure relates generally to a gear arrangement. More particularly, this disclosure relates to a gear arrangement that is configured to selectively transmit a rotational input to a turbomachine rotor.

Turbomachines, such as gas turbine engines, are known. A typical turbomachine includes multiple sections, such as a fan section, a compression section, a combustor section, and a turbine section. Many turbomachines, particularly gas turbine engines, have large rotors in the compression section that must be accelerated to high rotational speeds before the rotors sufficiently compress enough air to sustain operation of the turbomachine. A motor separate from the turbomachine drives a rotor shaft to accelerate the rotors. Some motors are used as generators after the turbomachine is self-sustaining. The generated power is supplied to various components, such as components on an aircraft.

A gearbox shaft from the motor is moveable between a position coupled with the rotor shaft and a position decoupled from the rotor shaft. In the coupled position, the gearbox shaft and the rotor shaft are rotatably connected. In the decoupled position, the gearbox shaft and the rotor shaft are independently rotatable. An internal failure mode within the motor or the engine may necessitate decoupling the gearbox shaft from the rotor shaft, for example. The decoupling ensures that errors or failure modes are not communicated between the gearbox shaft and the rotor shaft. The motor shaft typically continues to rotate even when decoupled from the gearbox shaft. A gear arrangement accommodates the rotating gearbox shaft whether the gearbox shaft is coupled with the rotor shaft or decoupled from the rotor shaft. The gearbox shaft can move eccentrically relative to the rotor shaft.

SUMMARY

An example gear arrangement includes a gearbox shaft and a journal shaft. The journal shaft establishes an opening that receives an end portion of the gearbox shaft. The gearbox shaft is configured to rotate the journal shaft. The journal shaft is configured to selectively rotatably couple with another shaft.

An example gas turbine engine gearbox arrangement includes a disconnect shaft and a gearbox shaft. The gearbox shaft has a first end rotatably coupled to an accessory gearbox. A journal shaft is received over an opposing second end of the gearbox shaft. The journal shaft is configured to rotate together with the gearbox shaft. The journal shaft is further configured to selectively rotatably engage the disconnect shaft to drive a rotor shaft of the gas turbine engine.

An example method of rotating a gas turbine engine rotor includes rotating a gearbox shaft. The method rotates a journal shaft with the gearbox shaft. The journal shaft is received over an end of the gearbox shaft. The method also selectively couples the journal shaft to another shaft that rotates a rotor.

These and other features of the disclosed examples can be best understood from the following specification and drawings, the following of which is a brief description:

BRIEF DESCRIPTION OF THE DRAWINGS

FIG. 1 shows a schematic view of an engine and a motor-generator of an aircraft.

FIG. 2 shows an example rotor assembly of the FIG. 1 engine.

DETAILED DESCRIPTION

Figure 3:
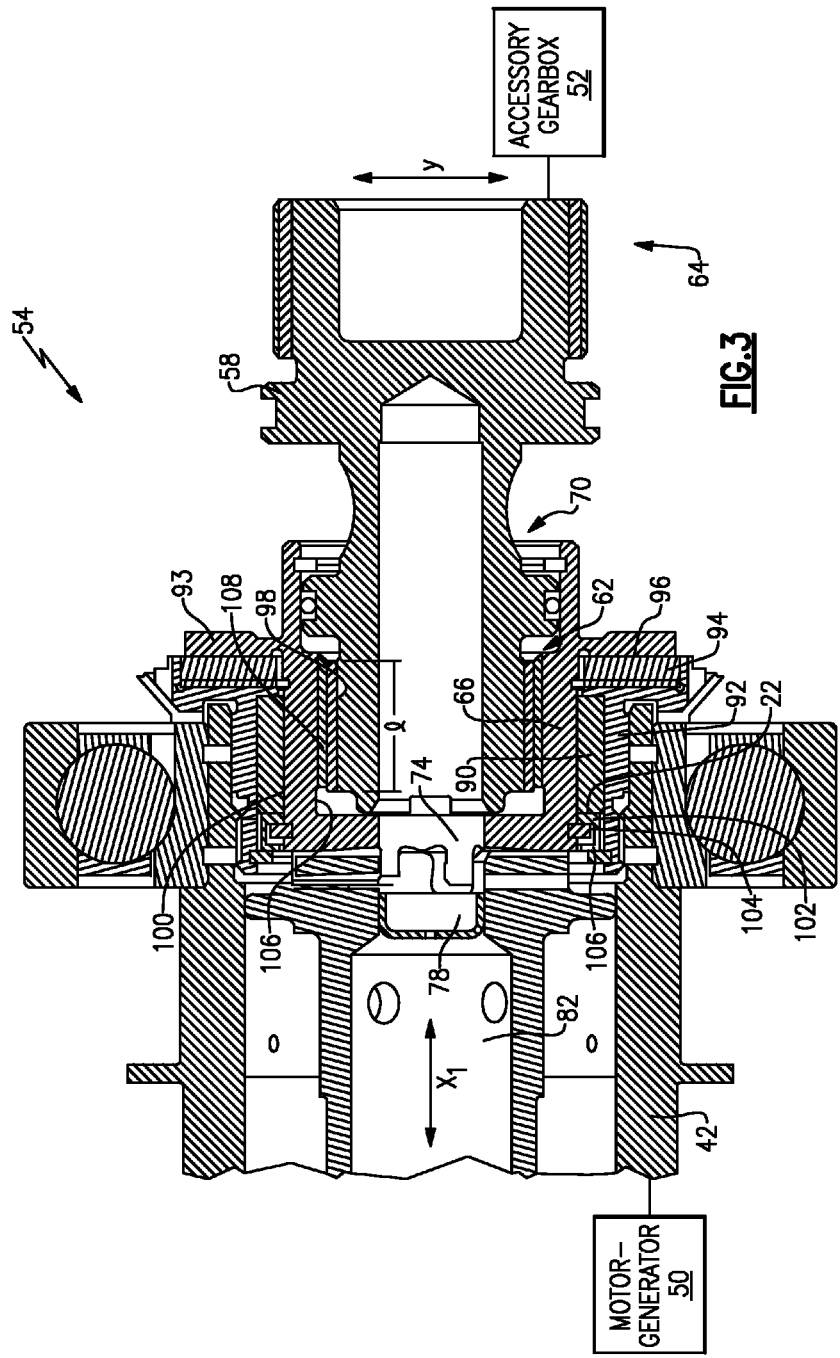
FIG. 3 shows a close-up section view of an example gear arrangement within the FIG. 1 aircraft having a gearbox shaft in a connected position.

Referring to FIGS. 1-2, a gas turbine engine 10 propels an aircraft 12. The gas turbine engine 10 is an example type of turbomachine.

The example gas turbine engine 10 includes (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X.

During operation, air is pulled into the gas turbine engine 10 by the fan section 14. Some of the air moves through a flow path 36 to a core of the gas turbine engine 10. The air moving through the flow path 36 is pressurized by the compressors 18 and 22, mixed with fuel, and burned within the combustor 26. The turbines 30 and 34 extract energy from the hot combustion gases flowing from the combustor 26.

As known, the compressors 18 and 22 include a rotor assembly 40 having rotor blades 44 connected to a low speed shaft 46. Rotating the low speed shaft 46 rotates the rotor blades 44. The rotor blades 44, when rotated, compress the air moving through the flow path 36.

In a two spool design, the high pressure turbine 30 utilizes the energy extracted from the hot combustion gases to power the high pressure compressor 22 through a high speed shaft 38, and the low pressure turbine 34 utilizes the extracted energy from the hot combustion gases to power the low pressure compressor 18 and the fan section 14 through the low speed shaft 46.

The examples described in this disclosure are not limited to the two spool engine architecture described, however, and may be used in other architectures, such as single spool axial design, a three spool axial design, and still other architectures. Further, although the examples described herein are described with regard to the gas turbine engine 10, those having skill in this art and the benefit of this disclosure will understand that other examples include other types of turbomachines.

The example aircraft 12 includes a motor-generator 50 that is used to rotate the rotor assembly 40 of the engine 10 during start-up of the engine 10. The accessory gearbox 52 is also used to drive the motor-generator 50 when the motor-generator 50 is operating in a generate mode. The motor-generator 50 provides a rotational input to the accessory gearbox 52 through a gear arrangement 54.

The example motor-generator 50 accelerates the rotor assembly 40 during start-up of the engine 10. The motor-generator 50 continues to drive rotation of the rotor assembly 40 until the rotor assembly 40 reaches a speed capable of compressing enough air to sustain operation of the engine 10. In this example, the motor-generator 50 operates as a generator after the engine 10 has reached a self-sustaining speed.

Referring to FIG. 3 with continuing reference to FIGS. 1-2, the example gear arrangement 54 includes a gearbox shaft 58 that is used to drive the accessory gearbox 52.

The example gear arrangement 54 selectively couples the accessory gearbox 52 to the engine 10. The selective coupling ensures that the motor-generator 50 can be disconnected from the engine 10 if a failure occurs. In a coupled position, the gearbox shaft 58, the shaft 42, and the disconnect shaft 82 are rotatably connected. In a decoupled position, the gearbox shaft 58 and the disconnect shaft 82 are independently rotatable. Given the disconnect shaft 82 is still coupled to the shaft 42, shaft 42 is also independently rotatable from the gearbox shaft 58.

In some examples, the motor-generator 50 is coupled to the engine 10 when the motor-generator 50 operates as a generator. In such examples, rotational input is then supplied to the motor-generator 50 from the engine 10. When operating as a generator, the motor-generator 50 provides electrical power to other areas of the aircraft 12 through the aircraft electrical system. Integrated drive generators and variable frequency generators are examples of the motor-generator 50.

When the motor-generator 50 operates as a motor, the motor-generator 50 rotates the gearbox shaft 58 to rotate the rotor assembly 40 of the engine 10. In this example, the rotors of the motor-generator 50 are press fit directly to the shaft 42.

In other examples, the motor-generator 50 is decoupled from the engine 10 in the event of a failure.

An end 62 of the gearbox shaft 58 is received within a journal shaft 66. In this example, the journal shaft 66 establishes an opening 70 configured to receive the end 62 of the gearbox shaft 58. The journal shaft 66 is cup-shaped in this example.

The other end 64 of the gearbox shaft 58 is rotatably coupled to the accessory gearbox 52. The diameter of the end 64 is larger than the end 62 in this example. The ends 62 and 64 are each larger than an axially central portion of the gearbox shaft 58, which causes the gearbox shaft 58 to have a dogbone configuration. The slimmed central portion acts as a shear section or torque limiter in this example.

The journal shaft 66 and the gearbox shaft 58 are configured to rotate together. That is, the journal shaft 66 is configured to rotate the gearbox shaft 58, and the gearbox shaft 58 is configured to rotate the journal shaft 66. In this example, the gearbox shaft 58 and the journal shaft 66 rotate together when the accessory gearbox 52 is coupled to the engine 10 and when the accessory gearbox 52 is decoupled from the engine 10.

When the accessory gearbox 52 is coupled to the engine 10, a jaw assembly 74 on the journal shaft 66 engages a corresponding jaw assembly 78 on a disconnect shaft 82. When the jaw assembly 74 is engaged with the jaw assembly 78, the disconnect shaft 82 rotates together with the journal shaft 66 and is connected to the shaft 42.

In this example, the disconnect shaft 82 and the shaft 42 are configured to rotate together. That is, the disconnect shaft 82 is configured to rotate the shaft 42, and the rotor shaft 42 is configured to rotate the disconnect shaft 82.

Decoupling the motor-generator 50 from the engine 10 is necessary when a failure in the aircraft 12 is discovered, for example. When the engine 10 is decoupled, the jaw assembly 74 on the journal shaft 66 is disengaged from the jaw assembly 78 on the disconnect shaft 82. When the jaw assembly 74 is disengaged from the jaw assembly 78, the disconnect shaft 82 is rotatable separate from the journal shaft 66.

The disconnect shaft 82 moves back and forth along in a direction $X_1$ as the jaw assembly 74 and 78 move between engaged and disengaged positions. A person having skill in this art and the benefit of this disclosure would understand how to incorporate suitable mechanisms, such as a worm gear (not shown), within the gear arrangement 54 for moving the jaw assembly 74 and 78 between engaged and disengaged positions.

The example journal shaft 66 slides against an axial/radial thrust bearing 90 and an axial thrust bearing 94 as the journal shaft 66 moves back and forth in the direction $X_1$. The example bearings 90 and 94 are carbon-based bearings and include steel on a thrust surface 96 and 22 to facilitate resisting thrust loads urging the journal shaft 66 toward the disconnect shaft 82 or engine 10. An outer wall 100 of the journal shaft 66 contacts the bearing 90 in this example.

During disengagement of the journal shaft 66 from the disconnect shaft 82, the journal shaft 66 forces a hardened thrust washer 102 against a carbon face 104. This is due to disconnect forces associated with separating disconnect jaws 74 from 78. In this example, a spacer 106 holds the hardened thrust washer 102 relative to the journal shaft 66. The thrust washer 102 is also keyed to the shaft 66 so they rotate together in this example.

Figure 4:
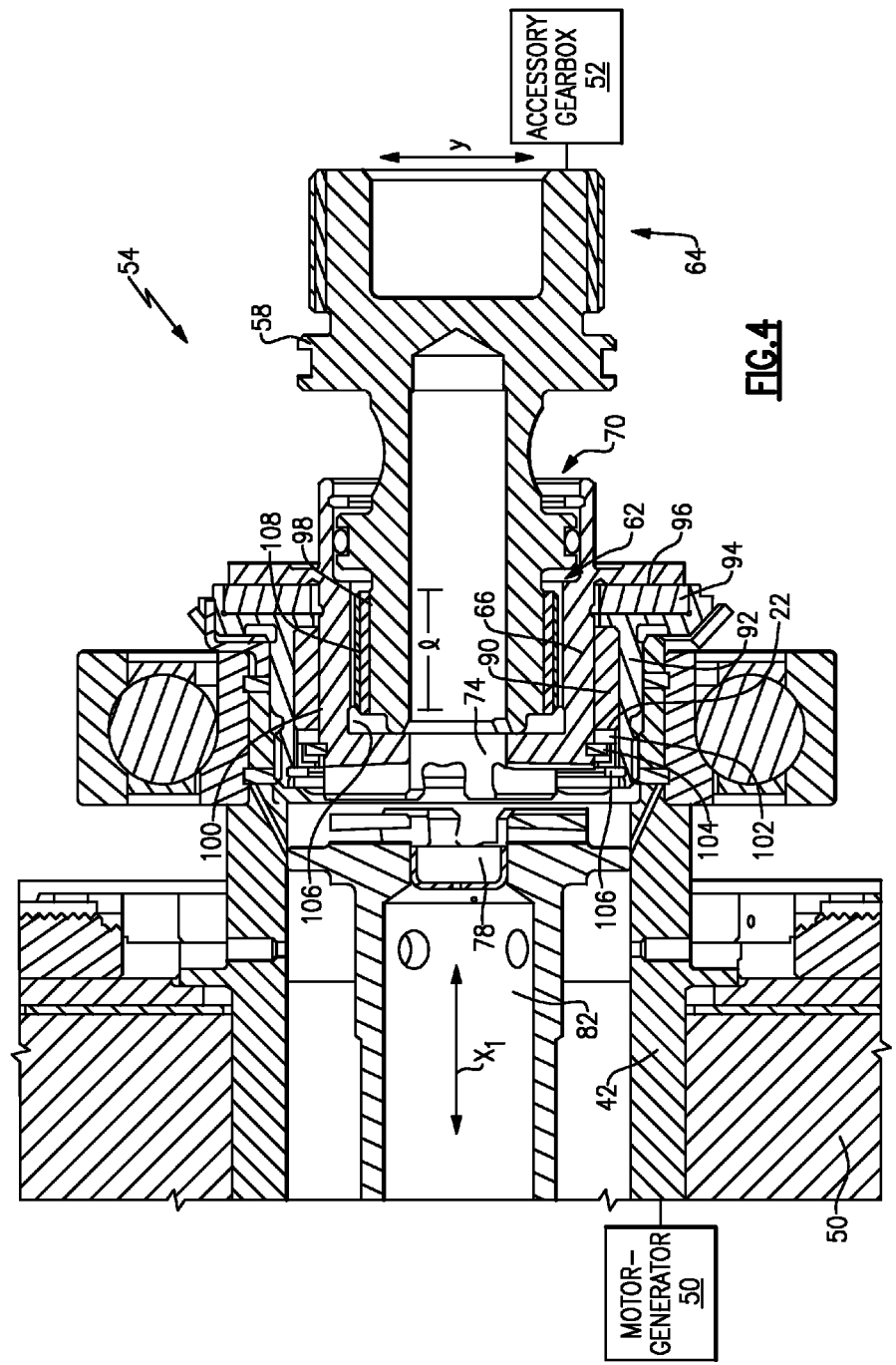
FIG. 4 shows a close-up section view of the FIG. 3 gear arrangement having the gearbox shaft in a disconnect position.
Figure 5:
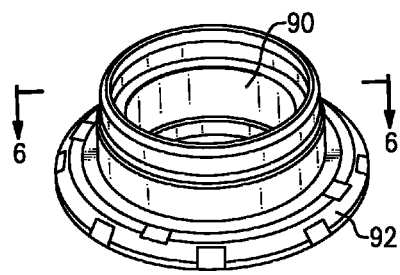
FIG. 5 shows a perspective view of a retainer assembly used in the FIG. 3 gearbox.
Figure 6:
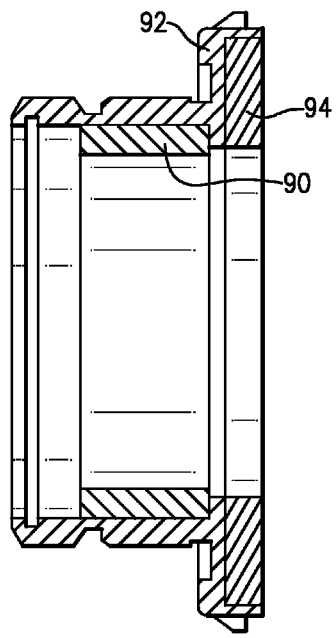
FIG. 6 shows a section view at line 6-6 of FIG. 5.
Figure 7:
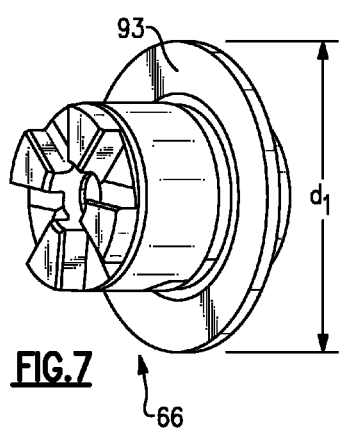
FIG. 7 shows a perspective view of an example journal shaft used in the FIG. 3 gearbox.

Referring to FIGS. 5-7 with continuing reference to FIGS. 3-4, the bearings 90 and 94 are carried by a retainer assembly 92 that rotates together with the shaft 42. The retainer assembly 92 and the bearings 90 and 94 rotate together with the journal shaft 66 when the jaw assembly 74 of the journal shaft 66 is engaged with the jaws 78 of the disconnect shaft 82.

The example journal shaft 66 includes a flange 93 having a diameter $d_1$. The flange 93 contacts the bearing 94 to oppose thrust loads. In this example, the diameter $d_1$ is greater than any diameter of the gearbox shaft 58. This diameter is larger to reduce bearing pressure*velocity (PV) loads, for example. The flange 93 opposes eccentric movement of the gearbox shaft 58 transferring to the journal shaft 66. This facilitates the journal shaft 66 maintaining an aligned position relative to the bearings 90 and 94 during rotation even though the gearbox shaft 58 may move eccentrically relative to the journal shaft 66.

The direction $X_1$ corresponds to the rotational axis of the journal shaft 66 in this example. When rotated, the journal shaft 66 rotates about the axis $X_1$ when the jaw assembly 74 and 78 are in an engaged position and when the jaw assembly 74 and 78 are in the disengaged position.

In this example, the end 62 of the gearbox shaft 58 includes a plurality of splines 98. An inner wall 106 of the journal shaft 66 includes a corresponding plurality of splines 108. The splines 98 rotate against the splines 108 to rotate the journal shaft 66 with the gearbox shaft 58. The splines 108 rotate against the splines 98 to rotate the gearbox shaft 58 with the journal shaft 66. An end of the gearbox shaft 58 opposite the end 62 may also include splines configured to rotatably couple the gearbox shaft 58 to the accessory gearbox 52.

The splines 108 and 98 extend axially for a length 1. The length 1 facilitates accommodating fluctuations in the position of the gearbox shaft 58 relative to the position of the journal shaft 66. Such as movements in a direction y relative to the journal shaft 66. Movement of the gearbox shaft 58 in the direction y relative to the journal shaft 66 is referred to as an eccentric movement of the gearbox shaft 58 relative to the journal shaft 66, for example.

When the gearbox shaft 58 is rotating eccentrically relative to the journal shaft 66, the rotational axis of the gearbox shaft 58 is transverse to the rotation axis of the journal shaft 66. The example gearbox shaft 58, due (in part) to the length 1 of the splines 108 and 98, accommodates eccentric movements of the gearbox shaft 58. The splines 98 maintain contact with the splines 108 even if the splines 98 are tilted relative to the splines 108.

Features of the disclosed examples include a journal shaft maintaining contact axially and radially against carbon bearings while accommodating eccentric movements of the gearbox shaft relative to the journal shaft. Another feature of the disclosed examples include adding steel to carbon bearings, and specifically the thrust surfaces of the carbon bearings, to react to thrust loads that tend to push the gearbox shaft away from the gearbox or into the generator. Yet another feature is that the design lessens PV loads given the geometry constraints.

Although an example embodiment has been disclosed, a worker of ordinary skill in this art would recognize that certain modifications would come within the scope of the claims. For that reason, the following claims should be studied to determine their true scope and content.

We claim:

1. A gas turbine engine gearbox arrangement, comprising:
   a disconnect shaft;
   a gearbox shaft having a first end rotatably coupled to an accessory gearbox; and
   a cup shaped journal shaft received over an opposing second end of the gearbox shaft, the cup shaped journal shaft configured to rotate together with the gearbox shaft, the cup shaped journal shaft further configured to selectively rotatably engage with the disconnect shaft to drive a rotor shaft of the gas turbine engine, wherein the cup shaped journal shaft includes walls extending along a rotational axis and a floor extending radially toward the axis past splines on the second end of the gearbox shaft.

2. The gas turbine engine gearbox arrangement of claim 1, wherein the first end of the gearbox shaft comprises splines that rotatably couple the gearbox shaft to the accessory gearbox, and the second end of the gearbox shaft comprises splines that rotatably couple the gearbox shaft to the journal shaft.

3. The gas turbine engine gearbox arrangement of claim 1, wherein the first end of the gearbox shaft has a first diameter and the second end of the gearbox shaft has a second diameter, the first end greater than the second end.

4. The gas turbine engine gearbox arrangement of claim 1, wherein the disconnect shaft is rotatably coupled to a variable frequency generator.

5. The gas turbine engine gearbox arrangement of claim 1, wherein the gearbox shaft is configured to rotate the journal shaft about a first axis when the gearbox shaft is rotating about a second axis transverse to the first axis.

6. The gas turbine engine gearbox arrangement of claim 1, including bearings configured to limit axial and radial movements of the journal shaft.

7. The gas turbine engine gearbox arrangement of claim 6, wherein the bearings comprise carbon.

8. The gas turbine engine gearbox arrangement of claim 7, wherein the bearings further comprise steel.

* * * * *